United States Patent
Wakabayashi et al.

(10) Patent No.: US 8,495,128 B2
(45) Date of Patent: Jul. 23, 2013

(54) RADIO COMMUNICATION SYSTEM, RADIO EQUIPMENT, AND SERVER

(75) Inventors: Naoyuki Wakabayashi, Daito (JP); Yoshihisa Nishigori, Daito (JP); Yasunari Miyake, Daito (JP); Daisuke Yamagiwa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 837 days.

(21) Appl. No.: 12/509,769

(22) Filed: Jul. 27, 2009

(65) Prior Publication Data

US 2010/0031154 A1 Feb. 4, 2010

(30) Foreign Application Priority Data

Jul. 28, 2008 (JP) ................... 2008-193410

(51) Int. Cl.
*G06F 15/16* (2006.01)

(52) U.S. Cl.
USPC ........... 709/201; 709/220; 455/450; 715/734; 375/354

(58) Field of Classification Search
USPC ................. 709/201, 220; 455/450; 715/734
See application file for complete search history.

(56) References Cited

U.S. PATENT DOCUMENTS

| | | | |
|---|---|---|---|
| 6,448,958 | B1 | 9/2002 | Muta |
| 7,180,970 | B1 * | 2/2007 | Warnagiris et al. ........... 375/354 |
| 7,496,641 | B2 | 2/2009 | Ohtsuka |
| 2004/0043770 | A1 * | 3/2004 | Amit et al. .................... 455/450 |
| 2005/0071419 | A1 * | 3/2005 | Lewontin ...................... 709/201 |
| 2005/0235046 | A1 | 10/2005 | Carpenter |

FOREIGN PATENT DOCUMENTS

| | | |
|---|---|---|
| EP | 1 587 281 A1 | 10/2005 |
| JP | 3210603 | 7/2001 |
| JP | 2003-316490 | 11/2003 |
| JP | 2005-128279 | 5/2005 |
| JP | 2005-348262 | 12/2005 |
| JP | 2007-122449 | 5/2007 |

OTHER PUBLICATIONS

Patent Abstracts of Japan for Japanese Publication No. 2003-316490, Publication date Nov. 7, 2003 (1 page).
Patent Abstracts of Japan for Japanese Publication No. 2005-128279, Publication date May 19, 2005 (1 page).
Patent Abstracts of Japan for Japanese Publication No. 2005-348262, Publication date Dec. 15, 2005 (1 page).
European Search Report for European Application No. EP 09 16 6524, mailed on Nov. 23, 2009 (6 pages).
Openwave: "The Value of WAP Push", [Online] Dec. 2001, pp. 1-18, XP002556690; Internet Retrieved from the Internet: URL1:http://developer.openwave.com/docs/WAP_Push_1201.pdf> [Retrieved Nov. 18, 2009] (18 pages).

* cited by examiner

*Primary Examiner* — Kyung H Shin
(74) *Attorney, Agent, or Firm* — Osha Liang LLP

(57) ABSTRACT

A plurality of servers each transmit data of an initial screen to be displayed on a display screen of radio equipment at a predetermined time interval. The radio equipment is in a reception waiting mode until it is connected to any one of the servers, and is performing channel scanning. Once the data of the initial screen transmitted from any one of the servers is received by the radio equipment, the radio equipment displays the initial screen on the display screen based on the received data. When an operation of a connection instruction is performed on the initial screen, the radio equipment is connected to the server corresponding to the initial screen.

12 Claims, 11 Drawing Sheets

FIG. 9A
FIG. 9B
FIG. 9C
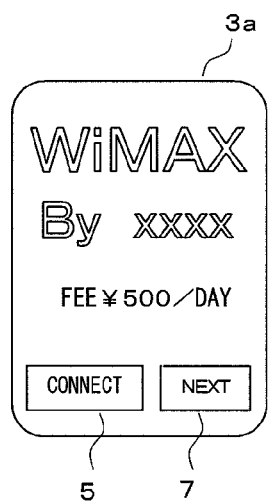
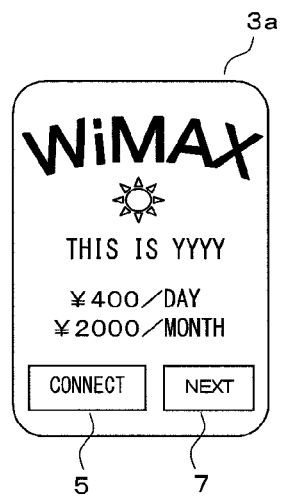
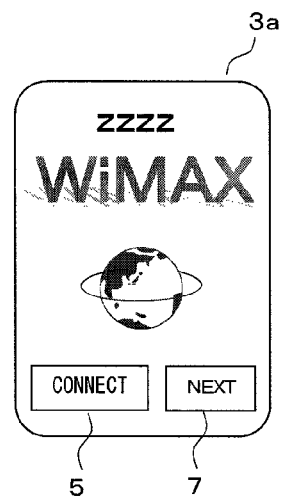

RADIO COMMUNICATION SYSTEM, RADIO EQUIPMENT, AND SERVER

TECHNICAL FIELD

The present invention relates to a radio communication system comprising a server and radio equipment that performs radio communication with the server.

BACKGROUND ART

As a system that performs communication between a server and radio equipment, there has been a system using, for example, virtual network computing (VNC). In this system, the server receives input information inputted by an operation unit of the radio equipment, and executes an application program in accordance with the input information, and further, generates screen data based on the execution result of the program and transmits the generated screen data to the radio equipment. The radio equipment displays, on a display unit, a screen based on the screen data received from the server to accept input by the operation unit on the displayed screen. In each of Patent Literatures 1 to 3 cited later, a system as mentioned above is described.

Taking an electronic mail as one example, while normal character input or the like can be performed on the screen by operating a key on the radio equipment side, it is the server that actually executes a mailer, and the radio equipment only transmits the inputted key information to the server. The server generates a screen image tailored to a size of the screen of the equipment based on the key information received from the radio equipment to transmit the screen image to the radio equipment. Accordingly, the screen displayed on the radio equipment is generated not by the radio equipment but by the server. The radio equipment thus needs to be at least provided with a screen display function, a key input function and a communication function, and does not need to load an application program and various types of data (screen data, font data and the like). This can reduce cost and ensure high security against theft and the like.

In Patent Literatures 4 and 5 cited later, transmission of data of an initial screen from a server to a terminal is described. In a system of Patent Literature 4, once the terminal makes a connection to the server, the server transmits, to the terminal, desktop image information, application instruction information, and image information of the initial screen corresponding to the server. In the terminal, when a desktop image is selected from a displayed list to select an application, the connection to the corresponding server is made, and the application functioning on the server becomes available. A system of Patent Literature 5 is an electronic conferencing system in which TCP (Transmission Control Protocol) and UDP (User Datagram Protocol) are switched to perform data communication. When a connection request from the terminal to the server is performed, and once sharing of a screen is permitted in the server, initial screen data is transmitted in UDP from the server to the terminal, so that the screen data is transmitted in UDP every time there is an update in a shared screen area.

CITATION LIST

Patent Literature

[Patent Literature 1] Japanese Unexamined Patent Publication No. 2003-316490

[Patent Literature 2] Japanese Unexamined Patent Publication No. 2005-128279

[Patent Literature 3] Japanese Patent Publication No. 3210603

[Patent Literature 4] Japanese Unexamined Patent Publication No. 2007-122449

[Patent Literature 5] Japanese Unexamined Patent Publication No. 2005-348262

SUMMARY OF INVENTION

Technical Problems

In a conventional radio communication system, for example, when radio equipment under contract with a plurality of companies is used, the radio equipment needs to generate an initial screen for selecting a company to which a user wants to connect and to display the initial screen on a display unit to select a connection destination on the screen. The radio equipment therefore requires a memory for storing data of the initial screen and fonts, which disadvantageously makes cost reduction difficult. This is true of a case where connection is made through roaming, a service that enables communication using a system of a company other than a contract company overseas.

The initial screen displayed in each system of the above-described Patent Literatures 4 and 5 is displayed after a connection request from the terminal to the server has been made and the terminal has been connected to the server. Accordingly, since the screen for performing the connection request to the server needs to be generated in the terminal, the above-described problem cannot be solved in these Patent Literatures.

In light of the above-described problems, an object of the present invention is to provide a radio communication system in which a connection destination can be selected before connection to a server without requiring an additional memory in radio equipment.

Solution to Problems

A radio communication system as a premise of the present invention includes a server and radio equipment that performs radio communication with the server. The radio equipment has a display unit and an operation unit. The server receives input information inputted by the operation unit of the radio equipment, and executes an application program in accordance with the input information. Further, the server generates screen data based on the execution result of the program and transmits the generated screen data to the radio equipment. The radio equipment displays a screen based on the screen data received from the server on the display unit and accepts input by the operation unit on the displayed screen.

The present invention is characterized in that in the above-described system, the server transmits data of an initial screen to be displayed on the display unit of the radio equipment at a predetermined time interval, and that the radio equipment is in a reception waiting mode until it is connected to the server, and upon receiving the data of the initial screen in the waiting mode, the radio equipment displays the initial screen on the display unit based on the received data.

With the above-described constitution, since when the radio equipment in the reception waiting mode receives the initial screen that the server transmits, the initial screen generated by the server is displayed on the display unit of the radio equipment, the connection destination can be selected before the connection to the server. In addition, since the initial screen does not need to be generated on the radio equipment side, a memory for storing the data of the initial screen and fonts is not required in the radio equipment, which can reduce the cost of the radio equipment.

According to the present invention, the server may be made up of a plurality of servers. In this case, channels different in frequency are assigned to the respective servers. The radio equipment scans the channels in the reception waiting mode to sequentially receive the initial screen data transmitted from the plurality of servers respectively, and to sequentially display the initial screens on the display unit.

With this constitution, since the initial screens transmitted from the respective servers are sequentially displayed on the display unit of the radio equipment, the initial screen can be automatically switched to be displayed without performing a special operation on the radio equipment side even when there are a plurality of connection destinations (companies).

In the present invention, it is preferable that the radio equipment include first instruction means for instructing connection to the server corresponding to the initial screen displayed on the display unit.

With this constitution, when the initial screen of a company to which the user wants to connect is displayed, the radio equipment can be surely connected to the desired server by instructing the connection by the first instruction means.

In the present invention, the radio equipment may include second instruction means for instructing shift to scanning of the next channel when the connection to the server is not instructed by the first instruction means.

With this constitution, when the displayed initial screen is not the initial screen of the company to which the user wants to connect, the scanning of the next channel is executed by the second instruction means without waiting for the display of the initial screen of the company to which the user wants to connect, which can shorten time required for displaying the desired initial screen.

In the present invention, the radio equipment may include a storage unit that stores the channel whose data could not be received as a result of scanning of the channels. In this case, during the next channel scanning, as to the channel stored in the storage, reception of initial screen data from the server corresponding to the relevant channel may be skipped to execute scanning of the next channel.

With this constitution, as to the channel whose data could not be received, the reception of the initial screen thereof is automatically skipped from next time. Thus, the time required for displaying the desired initial screen can be shortened.

Advantageous Effects Of Invention

According to the present invention, the radio communication system in which a connection destination can be selected before the connection to the server without requiring an additional memory in the radio equipment can be provided.

BRIEF DESCRIPTION OF DRAWINGS

FIGS. 9A to 9C show other examples of the initial screen displayed in the radio equipment;

DESCRIPTION OF EMBODIMENTS

Figure 1:
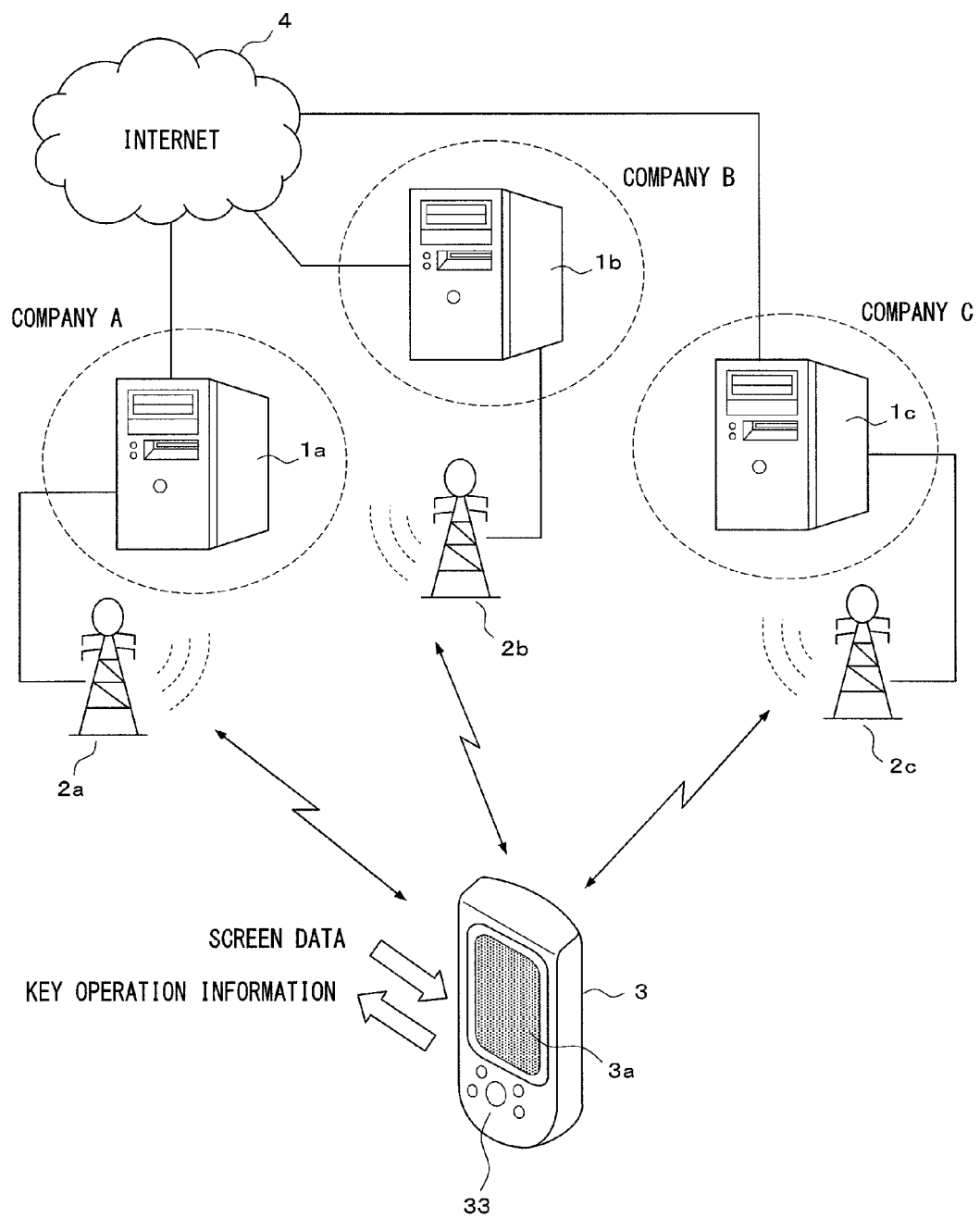
FIG. 1 is an overall configuration diagram of a radio communication system according to an embodiment of the present invention.

Hereinafter, referring to the drawings, embodiments of the present invention are described.

FIG. 1 is an overall configuration diagram of a radio communication system according to an embodiment of the present invention. Reference numerals $1a$, $1b$ and $1c$ denote servers operated by companies A, B and C performing communication business respectively. Reference numerals $2a$, $2b$ and $2c$ denote base stations connected to the servers $1a$, $1b$ and $1c$ through communication lines, respectively. Reference numeral 3 denotes radio equipment performing communication with the servers $1a$, $1b$ and $1c$ through the base stations $2a$, $2b$ and $2c$. The radio equipment 3 includes a display screen $3a$ made of, for example, a liquid crystal display (LCD), and an operation unit 33 made of a power switch and operation keys. The servers $1a$, $1b$ and $1c$ are also connected to an Internet 4. The radio equipment 3 performs communication with the servers $1a$, $1b$ and $1c$, for example, by WiMAX (Worldwide Interoperability for Microwave Access), which is a standard of fixed radio communication.

In the system of FIG. 1, an overview of the operation for connecting the radio equipment 3 to the servers $1a$, $1b$ and $1c$ is as follows. The servers $1a$, $1b$ and $1c$ each transmit data of an initial screen to be displayed on the display screen $3a$ of the radio equipment 3 at a predetermined time interval. Channels different in frequency are assigned to the servers $1a$, $1b$ and $1c$, respectively. The radio equipment 3 is in a reception waiting mode until it is connected to the server. In this waiting mode, the radio equipment 3 scans the channels to sequentially receive the respective initial screens transmitted from the servers $1a$, $1b$ and $1c$ through the base stations $2a$, $2b$ and $2c$ and then displays the initial screens on the display screen $3a$. A predetermined operation in the operation unit 33 allows the radio equipment 3 to be connected to the servers $1a$, $1b$ and $1c$. Details of the above-mentioned operation will be described later.

Operation after the radio equipment 3 is connected to the servers $1a$, $1b$ and $1c$ is the same as conventional operation. That is, the radio equipment 3 transmits key input information produced by operating the operation key of the operation unit 33 to the servers $1a$, $1b$ and $1c$ through the base stations $2a$, $2b$ and $2c$. The servers $1a$, $1b$ and $1c$ each executes an application program in accordance with the relevant input information based on the key input information received from the radio equipment 3 to generate screen data based on the execution result. The generated screen data is transmitted to the radio equipment 3 through the base stations $2a$, $2b$ and $2c$. In the radio equipment 3, a predetermined screen is displayed on the display screen 3a based on the screen data received from the servers 1a, 1b and 1c to accept key input by the operation unit 33 on the displayed screen. This allows a user to operate the radio equipment 3 while feeling as if the radio equipment 3 itself executes the application program.

Figure 2:
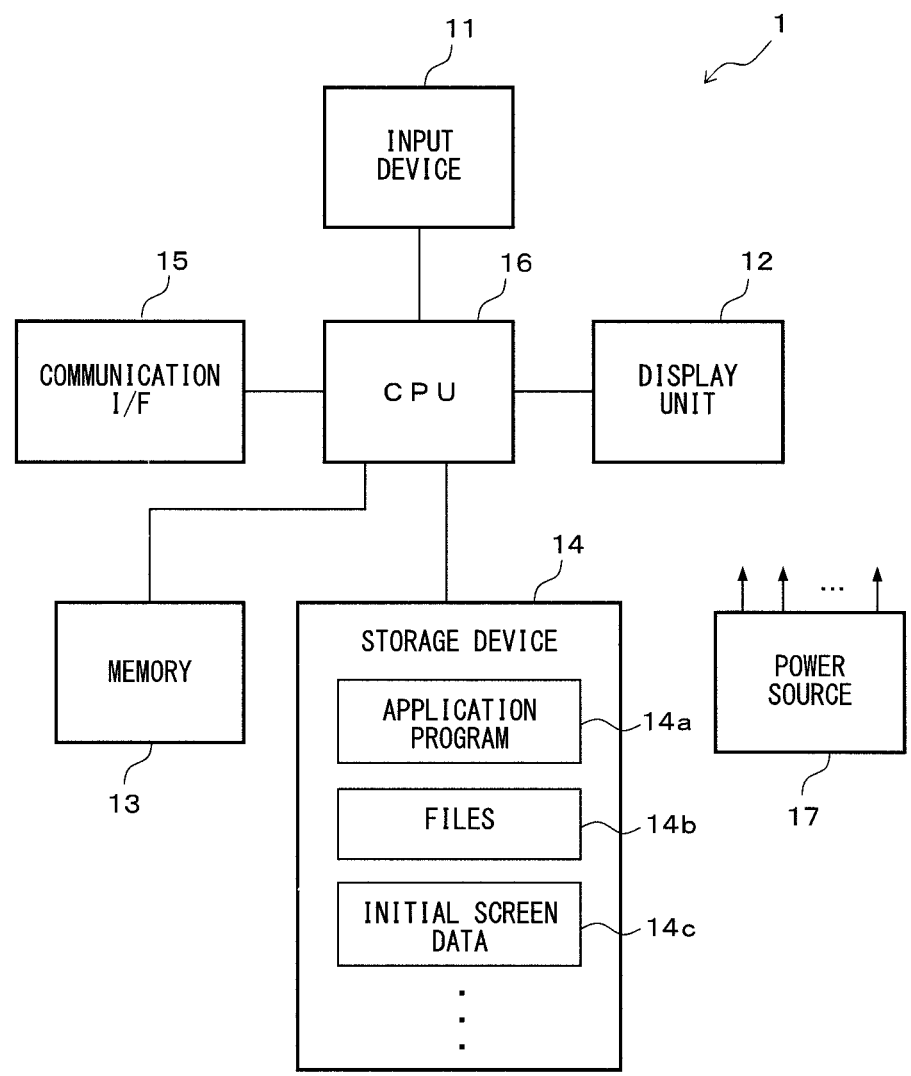
FIG. 2 is a block diagram showing a hardware configuration of a server.

FIG. 2 is a block diagram showing a hardware configuration of the servers 1a, 1b and 1c (hereinafter, these are collectively denoted by reference numeral 1). The server 1 includes an input device 11, a display unit 12, a memory 13, a storage device 14, a communication interface 15, a CPU 16, and a power source 17. The input device 11 is made up of a disk drive, a keyboard and the like, and the display unit 12 is made up of a display and a lamp. The memory 13 is made up of a RAM and a ROM. The storage device 14 is made of a hard disk, and stores an application program 14a, various files 14b, initial screen data 14c and the like. The initial screen data 14c may be stored in the memory 13. The communication interface 15 is an interface for performing the communication with the radio equipment 3 through the base stations 2a, 2b and 2c (hereinafter, these are collectively denoted by reference numeral 2) in FIG. 1. The CPU 16 controls the respective units of the server 1 totally, and the power source 17 supplies power to the respective units of the server 1.

Figure 3:
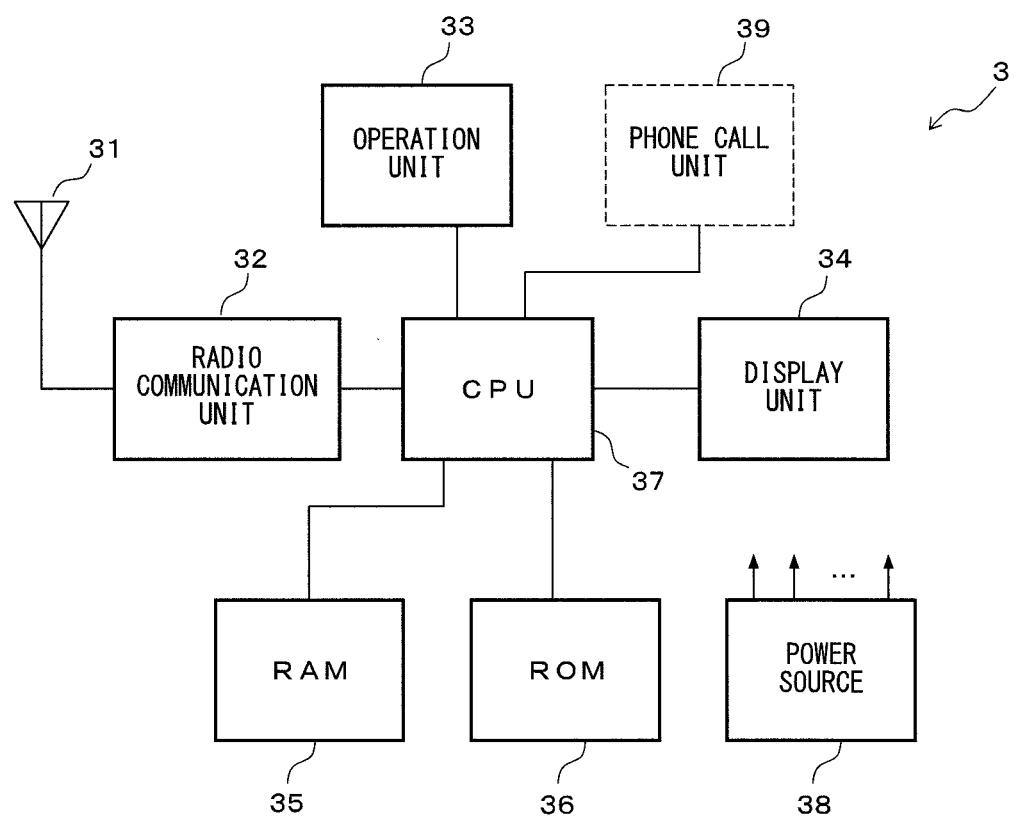
FIG. 3 is a block diagram showing a hardware configuration of radio equipment.

FIG. 3 is a block diagram showing a hardware configuration of the radio equipment 3. The radio equipment 3 includes an antenna 31, a radio communication unit 32, the operation unit 33, a display unit 34, a RAM 35, a ROM 36, a CPU 37, and a power source 38. In a case where the radio equipment 3 has a phone call function, a phone call unit 39 is provided. The phone call unit 39 is made up of a microphone, a speaker, and a peripheral circuit thereof, which are included in a general mobile phone. The antenna 31 and the radio communication unit 32 receive the screen data transmitted from the server 1 through the base station 2, and transmit the key input information to the server 1 through the base station 2. The operation unit 33 is made up of the power switch and the operation keys as described before. The display unit 34 is made up of an LCD, a drive circuit thereof and the like. The RAM 35 temporarily stores the screen data that the radio communication unit 32 has received from the server 1. The ROM 36 stores a program for operating the CPU 37. The CPU 37 controls the respective units of the radio equipment 3 totally, and the power source 38 supplies power to the respective units of the radio equipment 3.

The server 1 saves various files such as a telephone directory, phone call history, mail reception history/transmission history and a mail in process of creation generated by execution of the application program 14a in the file 14b and manages the same. The radio equipment 3 has no means for saving/managing these files. The application program 14a may be intended for image reproduction, and in this case, the data saved in the file 14b is image data, browsing history data and the like.

Next, in the radio communication system shown in FIG. 1, details of the operation for connecting the radio equipment 3 to the server 1, which is a feature of the present invention, is described with reference to FIGS. 4 to 7.

Figure 4:
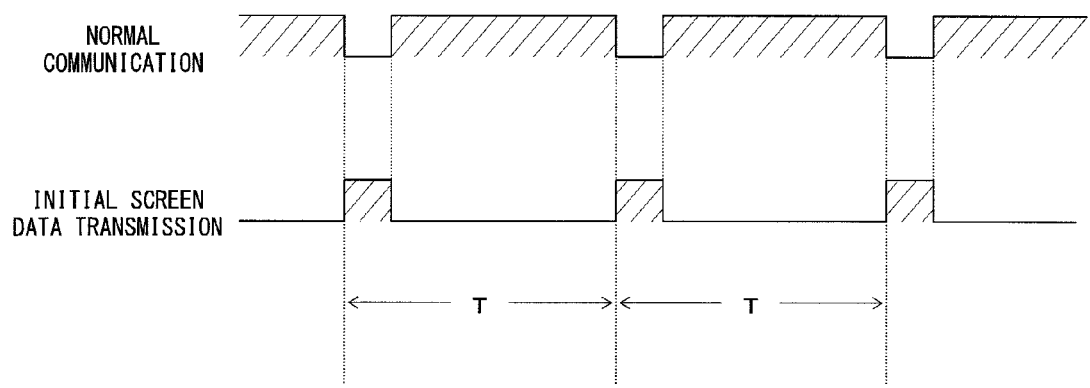
FIG. 4 is a time chart for explaining the operation of the server.

FIG. 4 is a time chart for explaining the operation of the server 1. The server 1 executes normal communication and transmission of the initial screen according to the present invention by a time-division multiplex method to transmit the data of the initial screen to be displayed on the display screen 3a of the radio equipment 3 at a time interval T. Although the time-division transmission is described here, it is only illustrative, and the transmission, for example, by a frequency-division multiplex method may be employed.

Figure 5:
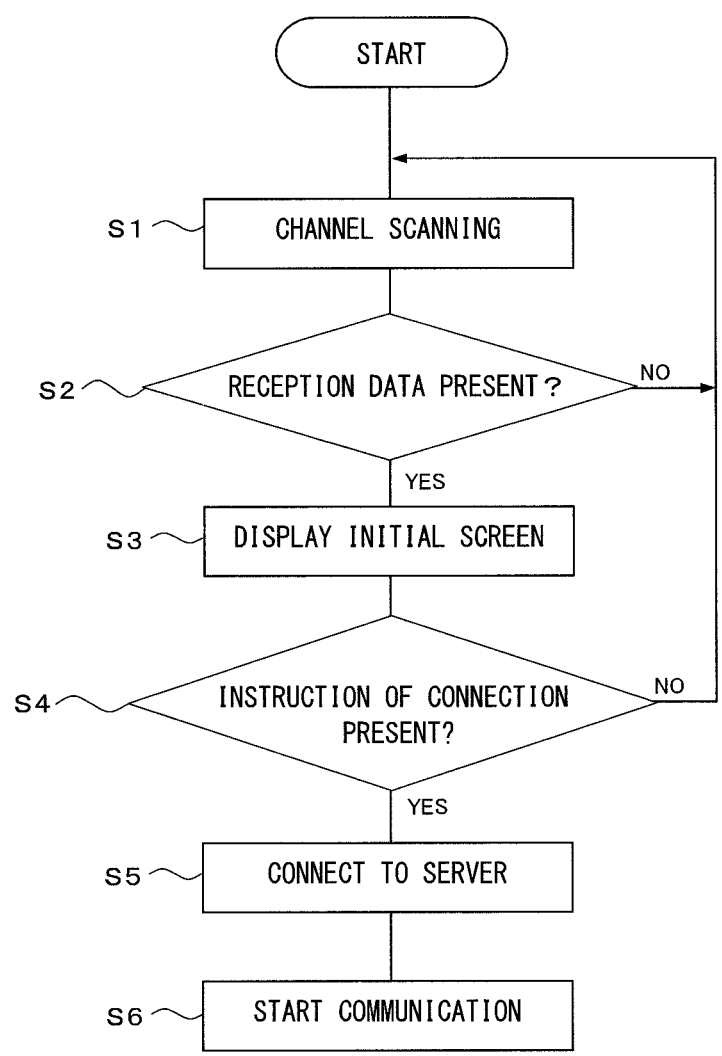
FIG. 5 is a flowchart for explaining the operation of the radio equipment in a first embodiment of the present invention.
Figure 6A:
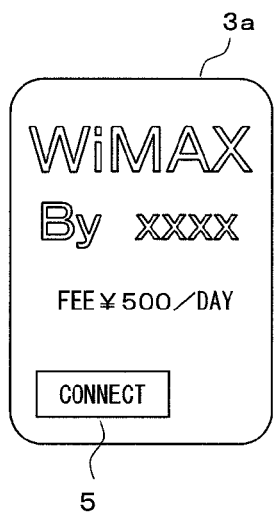
FIGS. 6A to 6C show examples of an initial screen displayed in the radio equipment.

FIG. 5 is a flowchart for explaining the operation of the radio equipment 3 in a first embodiment of the present invention. When the operation unit 33 is operated to turn on the power, the radio equipment 3 enters the reception waiting mode. In this state, the radio communication unit 32 performs channel scanning in step S1. Specifically, tuning frequencies of the radio communication unit 32 are sequentially switched to search receivable channels. In step S2, determination is made on whether or not the data has been received. If the radio communication unit 32 has not received the data (step S2: NO), then the processing returns to step S1 to continue the channel scanning. If the radio communication unit 32 has received the data (step S2: YES), the processing advances to step S3, in which the screen data transmitted from the server 1 is stored in the RAM 35, and the initial screen, for example, as shown in FIG. 6A is displayed on the display screen 3a of the display unit 34, based on the relevant screen data. This initial screen is displayed, for example, for five seconds.

Figure 6B:
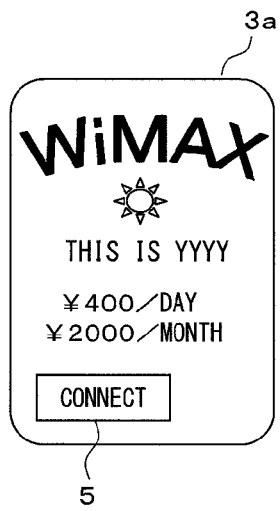
Figure 6C:
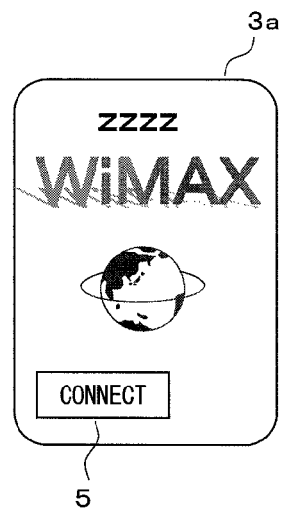

Next, in step S4, determination is made on whether or not an instruction of the connection to the server 1 has been performed. The connection instruction is performed by selecting a connection key 5 displayed on the initial screen of FIG. 6A. The connection key 5 is displayed as an icon, and this selection operation is performed by pressing the operation key in a position corresponding to the connection key 5 among the operation keys of the operation unit 33. The connection key 5 and the operation unit 33 are one embodiment of first instruction means in the present invention. When five seconds have passed with the connection key 5 unpressed, it is determined that the instruction of the connection to the server 1 has not been performed (step S4: NO), and the initial screen is deleted to return to step S1, in which the next channel will be scanned. If the data is received (step S2: YES), the initial screen, for example, as shown in FIG. 6B is displayed for five seconds (step S3), and if the connection key 5 is not selected for this period of time (step S4: NO), the initial screen is deleted to return to step S1, in which further next channel will be scanned. If the data is received (step S2: YES), the initial screen, for example, as shown in FIG. 6C is displayed for five seconds (step S3), and similar operation will be repeated after this. In this manner, the respective initial screens transmitted from the plurality of servers 1 are sequentially displayed on the display screen 3a at a constant time interval.

Figure 7:
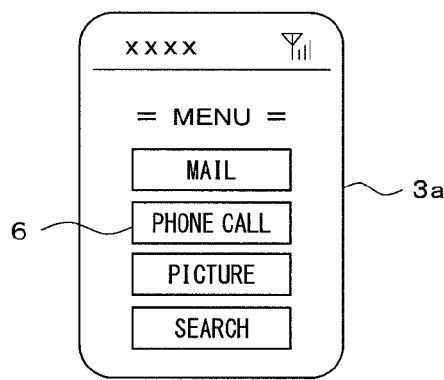
FIG. 7 shows an example of a menu screen displayed in the radio equipment.

In step S4, if the connection key 5 is selected to perform the instruction of the connection to the server 1 (step S4: YES), the processing advances to step S5, and the radio equipment 3 is connected to the server 1 through the radio communication unit 32 and the antenna 31. In step S6, the communication between the radio equipment 3 and the server 1 is started. The operation after this is the same as conventional operation. Once the communication is started, a menu screen, for example, as shown in FIG. 7 is displayed on the display screen 3a of the radio equipment 3. This screen is also generated and transmitted to the radio equipment 3 by the server 1. The user can utilize a desired application by selecting one of item keys 6 displayed on the menu screen with the operation key of the operation unit 33. As described before, it is the server 1 that executes these applications. The server 1 generates the screen in accordance with the application to transmit the screen to the radio equipment 3. The radio equipment 3 displays the received screen on the display screen 3a to accept key input by the operation unit 33 on this screen.

As described above, in the foregoing embodiment, when the radio equipment 3 in the reception waiting mode receives the initial screen transmitted by the server 1, the initial screen (FIG. 6) generated by the server 1 is displayed on the display screen 3a of the radio equipment 3, which allows the user to select the connection destination before the connection to the server 1. Moreover, since the radio equipment 3 does not need to generate the initial screen, no memory for storing the data of the initial screen and fonts is required in the radio equipment 3, which can reduce the cost of the radio equipment. For example, in the configuration of FIG. 3, the RAM 35 only needs to be a VRAM (Video Random Access Memory) that stores at least one screen data, and also the ROM 36 only needs to store at least programs for controlling the radio communication unit 32, the operation unit 33 and the display unit 34.

Moreover, since the initial screens transmitted from the respective servers 1 are sequentially displayed on the display screen 3a of the radio equipment 3, the initial screens are automatically switched and displayed without performing any special operation on the radio equipment 3 side even when the plurality of the connection destinations (companies) are present. Furthermore, since the connection key 5 for instructing the connection to the server 1 is displayed on the initial screen, the radio equipment 3 can be surely connected to the desired server 1 by selecting the connection key 5 when the initial screen of the company to which the user wants to connect is displayed.

Figure 8:
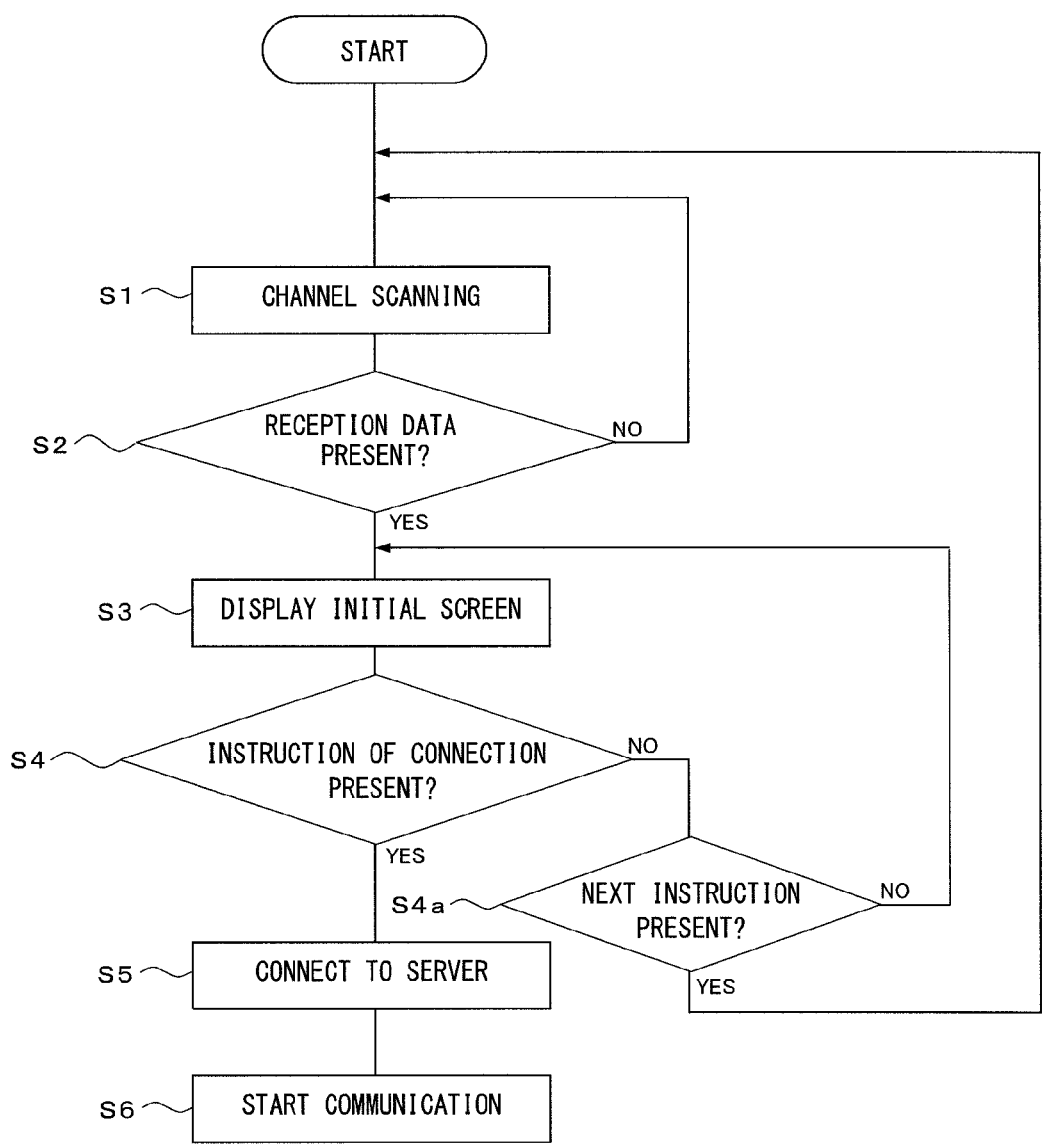
FIG. 8 is a flowchart for explaining the operation of radio equipment in a second embodiment of the present invention.

FIG. 8 is a flowchart for explaining the operation of the radio equipment 3 in a second embodiment of the present invention. In FIG. 8, the same reference numerals are given to the steps of performing the same processing as that of FIG. 5. Since steps S1 to S6 are the same as those of FIG. 5, their descriptions are omitted. A different point from FIG. 5 is that if there is no connection instruction in step S4 (step S4: NO), processing in step S4a is added. In step S4a, determination is made on whether or not the next scanning has been instructed. The instruction of the next scanning is performed by selecting a NEXT key 7 on each initial screen as shown in FIG. 9. The NEXT key 7 is displayed as an icon, and this selection operation is performed by pressing the operation key in a position corresponding to the NEXT key 7 among the operation keys of the operation unit 33. The NEXT key 7 and the operation unit 33 are one embodiment of second instruction means in the present invention.

If the NEXT key 7 is selected to instruct the next scanning (step S4a: YES), the processing returns to step S1 at this point, and the next scanning is immediately started. Accordingly, when the displayed initial screen is not the initial screen of the company to which the user wants to connect, by selecting the NEXT key 7 to execute scanning of the next channel without waiting for the display of the initial screen of the company to which the user wants to connect, time required for displaying the desired initial screen can be shortened.

Figure 10:
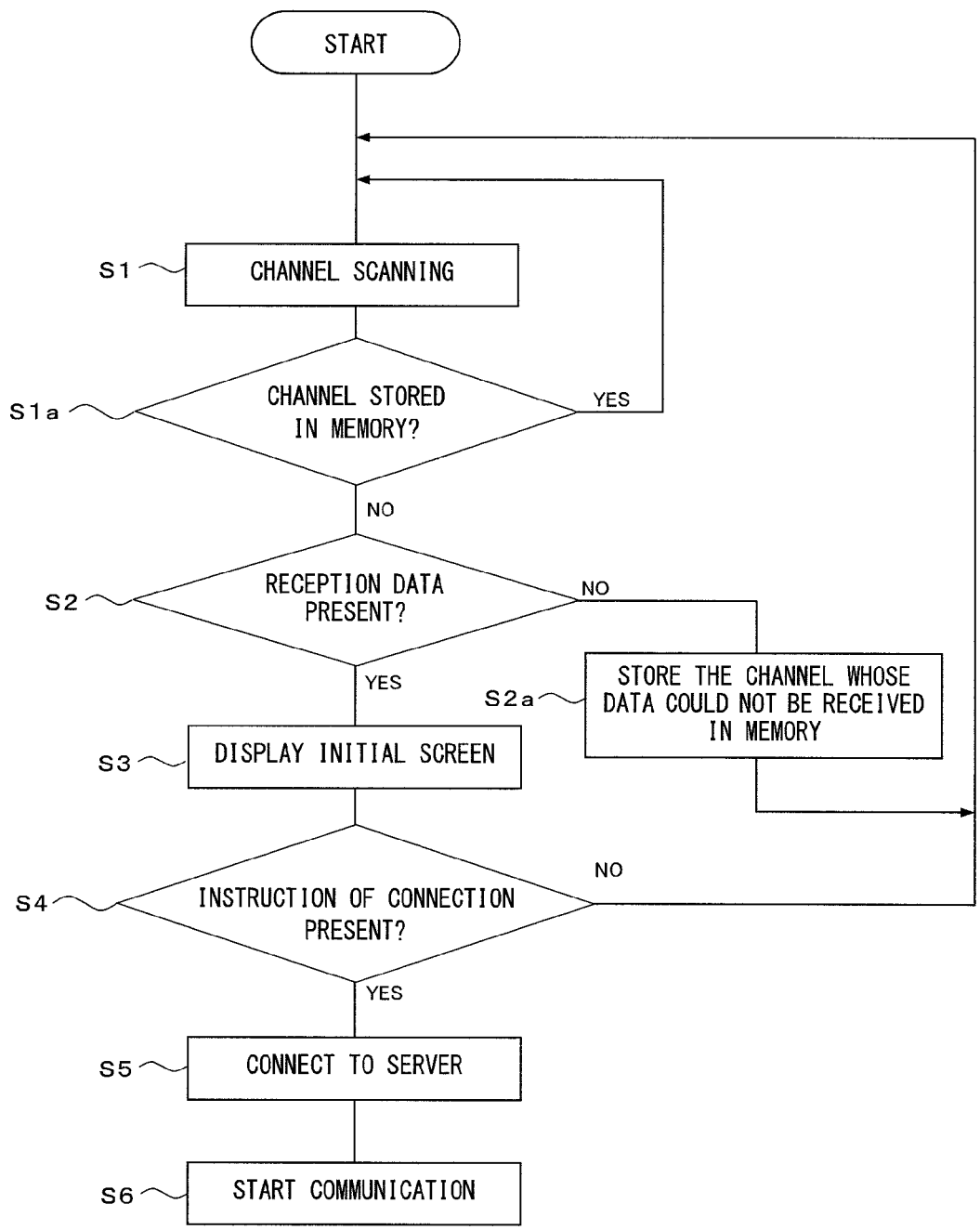
FIG. 10 is a flowchart for explaining the operation of radio equipment in a third embodiment of the present invention.

FIG. 10 is a flowchart for explaining the operation of the radio equipment 3 in a third embodiment of the present invention. In FIG. 10, the same reference numerals are given to the steps of performing the same processing as that of FIG. 5. Since steps S1 to S6 are the same as those of FIG. 5, their descriptions are omitted. Different points from FIG. 5 are that after step S1, step S1a of determining whether or not a channel to be scanned is a channel stored in a memory is added, and that if no data is received in step S2 (step S2: NO), step S2a of storing, in a memory, a channel in which no reception data has been found is added. The memory in this case is, for example, the RAM 35 (FIG. 3), and is one embodiment of a storage unit in the present invention.

In step S2a, the channel whose data could not be received is stored in the memory. In step S1, when the channel scanning is performed, if the channel is stored in the memory (step S1a: YES), the reception of the initial screen data from the server 1 corresponding to the relevant channel is skipped, and scanning of the next channel is executed (step S1). Accordingly, as to the channel whose data could not be received, the reception of the initial screen is automatically skipped from next time, which can shorten the time required for displaying the desired initial screen.

In the present invention, various embodiments other than the above-described ones can be employed. For example, while, in the above-described embodiments, the example in which the communication by WiMAX is performed between the radio equipment 3 and the server 1 is cited, the present invention can be applied to a communication method other than WiMAX by changing the specification of the radio communication unit 32 of the radio equipment 3 to a specification for other than WiMAX.

Moreover, while in the above-described embodiments, the example in which the selection of the connection key 5 and the NEXT key 7 displayed on the initial screen is performed by the operation unit 33 is cited, the display unit 34 may be made of a touch panel to directly operate the connection key 5 and the NEXT key 7.

As other embodiments of the present invention, for example, the following (1) to (4) are conceivable.

Figure 11:
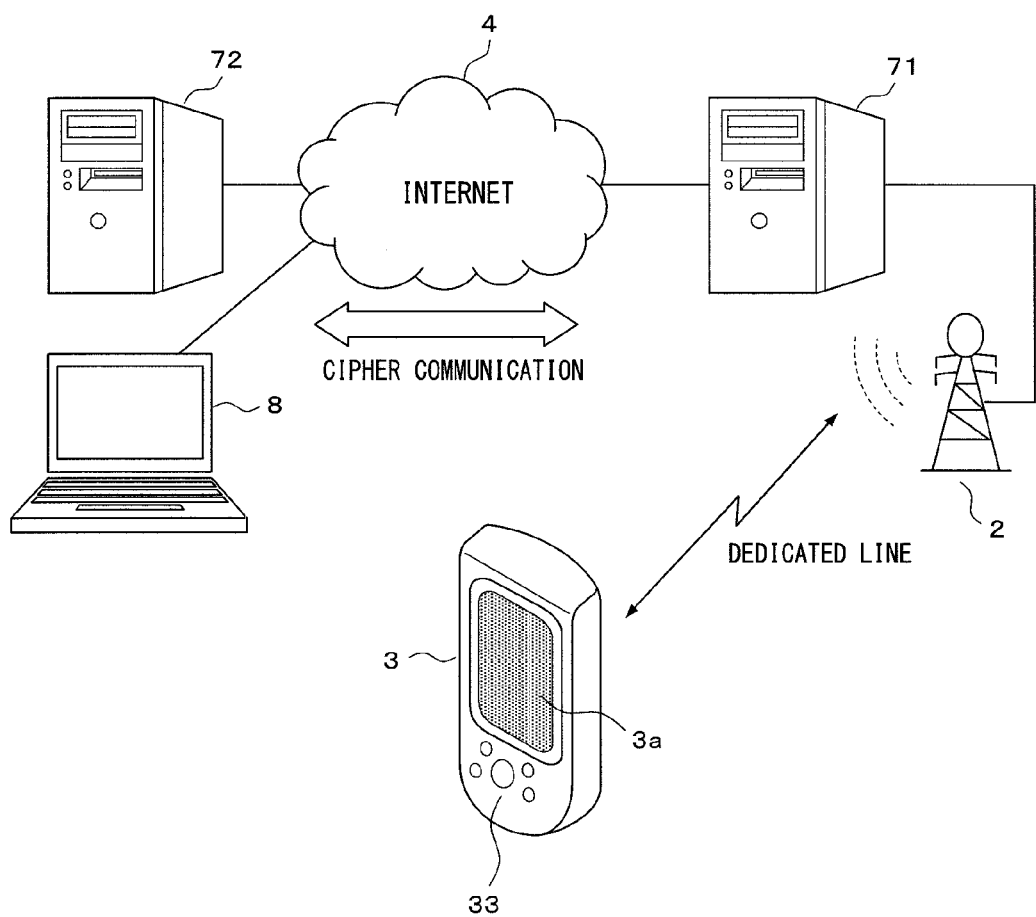
FIG. 11 is a system configuration diagram in a case where a server of a company is made up of two servers.

(1) As shown in FIG. 11, a server of one company is made up of a first server 71 and a second server 72, the servers 71 and 72 are connected through the internet 4, and the first server 71 and the radio equipment 3 are connected by a dedicated line. The radio equipment 3 is connected to the second server 72 through the first sever 71, and the second server 72 executes an application program and generates a screen to transmit the screen to the radio equipment 3 through the first sever 71. In this case, since the radio equipment 3 and the first server 71 are connected by the dedicated line, security is ensured, while since the first server 71 and the second server 72 are connected through the Internet 4, the security cannot be ensured. Consequently, by ciphering the communication between the first server 71 and the second server 72, the communication with security can be performed even through the Internet 4 without increasing load on the radio equipment 3. In place of the second server 72, a PC (Personal Computer) 8 may be used.

Figure 12:
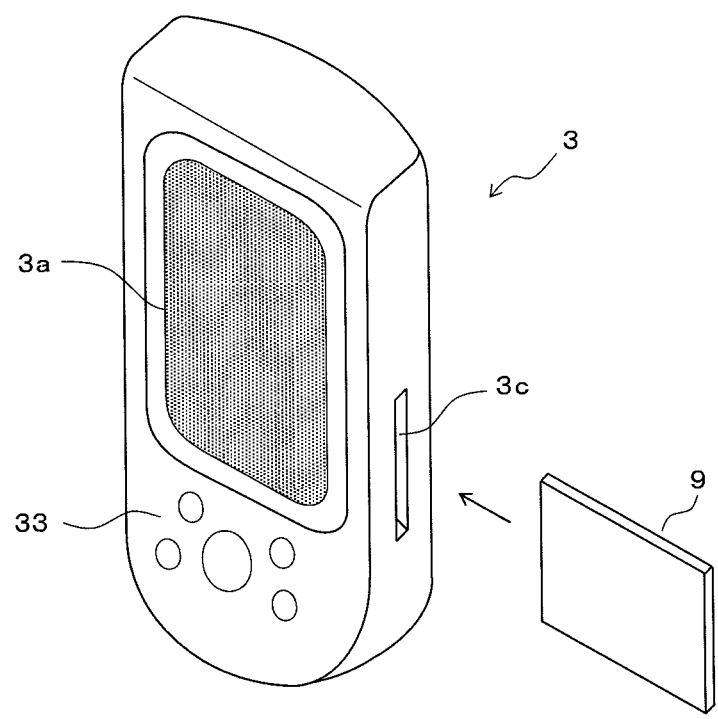
FIG. 12 is an appearance diagram of radio equipment and a recording medium to be attached thereto.

(2) As shown in FIG. 12, a recording medium 9 on which data for user authentication is recorded is used, and this recording medium 9 is attached to a slot 3c of the radio equipment 3 to perform user authentication with the server 1 at the start of communication. The server 1 checks the correspondence between a saved file and the radio equipment 3 based on authentication data transmitted from the radio equipment 3 to permit an access to the file from the radio equipment 3. In a case where the radio equipment 3 is a mobile phone, the recording medium 9 can be also used as an SIM (Subscriber Identification Module).

(3) When a part of the screen transmitted from the server 1 to the radio equipment 3 is changed, the server 1 transmits a difference of the screen data (image data) and a display position, and the radio equipment 3 displays a screen of the received difference in a predetermined position. This can make a size of the screen data smaller and reduce a communication amount.

(4) The radio equipment 3 transmits, to the server 1, information including a size of the display screen 3a and the presence or absence of a decoding (decompression) function of the screen data at the start of communication with the server 1. The server 1 determines the size of the screen and whether encoding (compression) is necessary or not based on the relevant information to generate the screen data. If the size of the display screen 3a is large, a data amount of the screen data is large, and it takes long to display. However, by generating compressed screen data in accordance with the display screen in advance, the communication amount can be reduced to shorten the time required for displaying. The data to be encoded is not limited to a still image but may be a moving image.

The invention claimed is:

1. A radio communication system comprising:
a server; and
a radio equipment that performs radio communication with the server, wherein
the server comprises:
   a storage unit that stores initial screen data indicating communication/connection information; and
   a transmitting unit that transmits the initial screen data to the radio equipment, and the radio equipment comprises:
   a radio communication unit that sequentially switches tuning frequencies and searches for the server capable of communicating with the radio equipment
   a receiving unit that receives the initial screen data from the server detected by the radio communication unit;
   a display unit that displays the initial screen for a given period of time based on the initial screen data received by the receiving unit; and
   an accepting unit that accepts an instruction of connection from a user for connecting the radio equipment to the server in the initial screen displayed by the display unit,
   wherein the receiving unit receives the initial screen data before the radio equipment is connected to the server.

2. The radio communication system according to claim 1, wherein the server is made up of a plurality of servers, and channels different in frequency are assigned to the respective servers,
   the radio communication unit performs channel-scanning for the plurality of servers to detect the server capable of communicating with the radio equipment,
   the receiving unit receives the initial screen data transmitted from at least one server detected by the radio communication unit, and
   the display unit sequentially displays the initial screen for the given period of time based on the initial screen data received by the receiving unit.

3. The radio communication system according to claim 1, further comprising a determining unit that determines the server as a specified server with which the radio equipment should perform radio communication, wherein the determining unit determines the server as the specified server when the instruction of the connection to the server is accepted by the accepting unit during the given period of time.

4. The radio communication system according to claim 3, wherein when the instruction of the connection to the server is not accepted by the accepting unit during the given period of time, the determining unit does not determine the server as the specified server.

5. A server of a radio communication system comprising a radio equipment that performs radio communication with the server, the server comprising:
   a storage unit that stores initial screen data indicating communication/connection information; and
   a transmitting unit that transmits the initial screen data to the radio equipment, wherein the radio equipment comprises:
   a radio communication unit that sequentially switches tuning frequencies and searches for the server capable of communicating with the radio equipment;
   a receiving unit that receives the initial screen data from the server detected by the radio communication unit;
   a display unit that displays the initial screen for a given period of time based on the initial screen data received by the receiving unit; and
   an accepting unit that accepts an instruction of connection from a user for connecting the radio equipment to the server in the initial screen displayed by the display unit,
   wherein the receiving unit receives the initial screen data before the radio equipment is connected to the server.

6. The server according to claim 5, wherein
the server is made up of a plurality of servers, and channels different in frequency are assigned to the respective servers,
the radio communication unit performs channel-scanning for the plurality of servers to detect the server capable of communicating with the radio equipment,
the receiving unit receives the initial screen data transmitted from at least one server detected by the radio communication unit, and
the display unit sequentially displays the initial screen for the given period of time based on the initial screen data received by the receiving unit.

7. The server according to claim 5, wherein
the radio communication system further comprises a determining unit that determines the server as a specified server with which the radio equipment should perform radio communication, and
the determining unit determines the server as the specified server when the instruction of the connection to the server is accepted by the accepting unit during the given period of time.

8. The server according to claim 7, wherein when the instruction of the connection to the server is not accepted by the accepting unit during the given period of time, the determining unit does not determine the server as the specified server.

9. A radio equipment of a radio communication system, the radio equipment being adapted to perform radio communication with a server of the radio communication system and comprising:
   a radio communication unit that sequentially switches tuning frequencies and searches for the server capable of communicating with the radio equipment;
   a receiving unit that receives initial screen data indicating communication/connection information from the server detected by the radio communication unit;
   a display unit that displays the initial screen for a given period of time based on the initial screen data received by the receiving unit; and
   an accepting unit that accepts an instruction of connection from a user for connecting the radio equipment to the server in the initial screen displayed by the display unit,
   wherein the receiving unit receives the initial screen data before the radio equipment is connected to the server.

10. The radio equipment according to claim 9, wherein
the server is made up of a plurality of servers, and channels different in frequency are assigned to the respective servers,
the radio communication unit performs channel-scanning for the plurality of servers to detect the server capable of communicating with the radio equipment,
the receiving unit receives the initial screen data transmitted from at least one server detected by the radio communication unit, and the display unit sequentially displays the initial screen for the given period of time based on the initial screen data received by the receiving unit.

11. The radio equipment according to claim 9, further comprising a determining unit that determines the server as a specified server with which the radio equipment should perform radio communication, wherein the determining unit determines the server as the specified server when the instruction of the connection to the server is accepted by the accepting unit during the given period of time.

12. The radio equipment according to claim 11, wherein when the instruction of the connection to the server is not accepted by the accepting unit during the given period of time, the determining unit does not determine the server as the specified server.

* * * * *